(12) United States Patent
Lloyd et al.

(10) Patent No.: US 9,120,474 B2
(45) Date of Patent: Sep. 1, 2015

(54) MECHANICAL BYPASS VALVE FOR REGENERATIVE AIR BRAKE MODULE

(75) Inventors: Jeffrey M. Lloyd, Auburn Hills, MI (US); Kranti Kiran Manga, Rochester, MI (US); Ken Flory, Commerce Township, MI (US); Michael Marcetti, Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 451 days.

(21) Appl. No.: 13/160,610

(22) Filed: Jun. 15, 2011

(65) Prior Publication Data

US 2012/0319463 A1 Dec. 20, 2012

(51) Int. Cl.
| | | |
|---|---|---|
| *B60T 13/74* | (2006.01) | |
| *B60T 17/22* | (2006.01) | |
| *B60T 1/10* | (2006.01) | |
| *B60T 13/58* | (2006.01) | |

(52) U.S. Cl.
CPC . *B60T 17/22* (2013.01); *B60T 1/10* (2013.01); *B60T 13/586* (2013.01)

(58) Field of Classification Search
CPC ......... A01B 12/006; B60T 17/22; B60T 1/10; B60T 13/586
USPC .............. 303/3, 9, 114.3, 115.4, 116.1, 118.1
See application file for complete search history.

(56) References Cited

U.S. PATENT DOCUMENTS

| | | | |
|---|---|---|---|
| 3,706,351 A * | 12/1972 | Neisch ........................... 180/338 |
| 3,952,993 A * | 4/1976 | Roberts et al. .................. 251/20 |
| 4,121,873 A * | 10/1978 | Durling ............................. 303/7 |
| 4,156,547 A * | 5/1979 | Marsh ........................... 303/145 |
| 4,410,218 A * | 10/1983 | Bueler ........................ 303/9.66 |
| 5,340,212 A * | 8/1994 | Latvala ............................. 303/7 |
| 5,342,119 A * | 8/1994 | Smith et al. ................. 303/113.2 |
| 6,033,039 A | 3/2000 | Dieringer |
| 6,102,493 A | 8/2000 | Schmitt |
| 6,106,079 A * | 8/2000 | Fisher ............................. 303/28 |
| 6,183,050 B1 * | 2/2001 | Ganzel ...................... 303/114.1 |
| 6,238,013 B1 * | 5/2001 | Koelzer ..................... 303/118.1 |
| 6,290,307 B1 | 9/2001 | Poertzgen et al. |
| 6,378,958 B1 | 4/2002 | Batchelor |
| 6,655,750 B2 | 12/2003 | Soupal |
| 6,912,851 B2 | 7/2005 | Batchelor et al. |
| 7,077,481 B2 * | 7/2006 | Marsh et al. .................... 303/40 |
| 7,204,563 B2 | 4/2007 | Soupal |
| 7,658,453 B2 | 2/2010 | Soupal |
| 7,722,055 B2 | 5/2010 | Hall et al. |
| 2003/0192756 A1 | 10/2003 | Barbison et al. |
| 2005/0057088 A1* | 3/2005 | Washington .................... 303/69 |
| 2005/0109024 A1 | 5/2005 | Nohl et al. |
| 2006/0076824 A1 | 4/2006 | Soupal |
| 2008/0258542 A1 | 10/2008 | Soupal |
| 2009/0140474 A1 | 6/2009 | Lloyd |
| 2010/0125398 A1 | 5/2010 | Headlee et al. |

* cited by examiner

*Primary Examiner* — Robert A Siconolfi
*Assistant Examiner* — Mahbubur Rashid
(74) *Attorney, Agent, or Firm* — Brooks Kushman P.C.

(57) ABSTRACT

An air braking system for a vehicle blends regenerative and foundation braking during low deceleration conditions in an effective and controlled manner. The braking system also includes a mechanical override that bypasses system electronics in response to an aggressive brake request such that treadle circuit pressure is sent directly to a brake relay circuit to actuate vehicle brakes.

17 Claims, 12 Drawing Sheets

MECHANICAL BYPASS VALVE FOR REGENERATIVE AIR BRAKE MODULE

TECHNICAL FIELD

This invention generally relates to a regenerative air brake module for a vehicle that includes a mechanical bypass.

BACKGROUND OF THE INVENTION

Hybrid vehicles include an e-machine or other alternative power source which works in conjunction with an internal combustion engine to drive the vehicle. The vehicle includes traditional foundation braking and regenerative braking can also be provided by the alternative power source.

Hybrid vehicles recapture braking energy that would otherwise be lost as heat through foundation braking to improve vehicle operational efficiency. When regenerative braking is being performed, it is important that the vehicle operator's braking and handling "feel" be unaffected. To achieve this there should be controlled blending of regenerative and foundation braking such that the vehicle operator can operate the vehicle in a normal and predictable manner. Maintaining this feel for hybrid commercial truck braking systems presents even more challenges. Further, it is important that mechanical safety features be incorporated into the system in the event of a failure of the regenerative braking portion of the brake system.

SUMMARY OF THE INVENTION

An air brake system for a vehicle blends regenerative and foundation braking during low deceleration conditions in an effective and controlled manner. The braking system also includes a mechanical override that bypasses system electronics in response to an aggressive brake request such that treadle circuit pressure is sent directly to a brake relay circuit to actuate vehicle brakes.

In one example, the mechanical override comprises a valve assembly that includes a valve body having a first port adapted for connection to a control valve and pressure regulator, a second port adapted for connection to a brake relay circuit, a third port adapted for connection to a treadle circuit, and an exhaust port. A stage one valve is positioned within the valve body and is biased to a normally open position. A stage two valve is positioned within the valve body and is biased to a normally closed position. In response to treadle pressure that exceeds an override limit, the stage one valve is configured to move to a closed position to block air from being exhausted by the control valve and pressure regulator out of the exhaust port and the stage two valve is configured to directly connect the treadle circuit to the brake relay circuit to deliver treadle circuit air pressure to a vehicle brake.

These and other features of the present invention can be best understood from the following specification and drawings, the following of which is a brief description.

DETAILED DESCRIPTION OF THE PREFERRED EMBODIMENT

Figure 1:
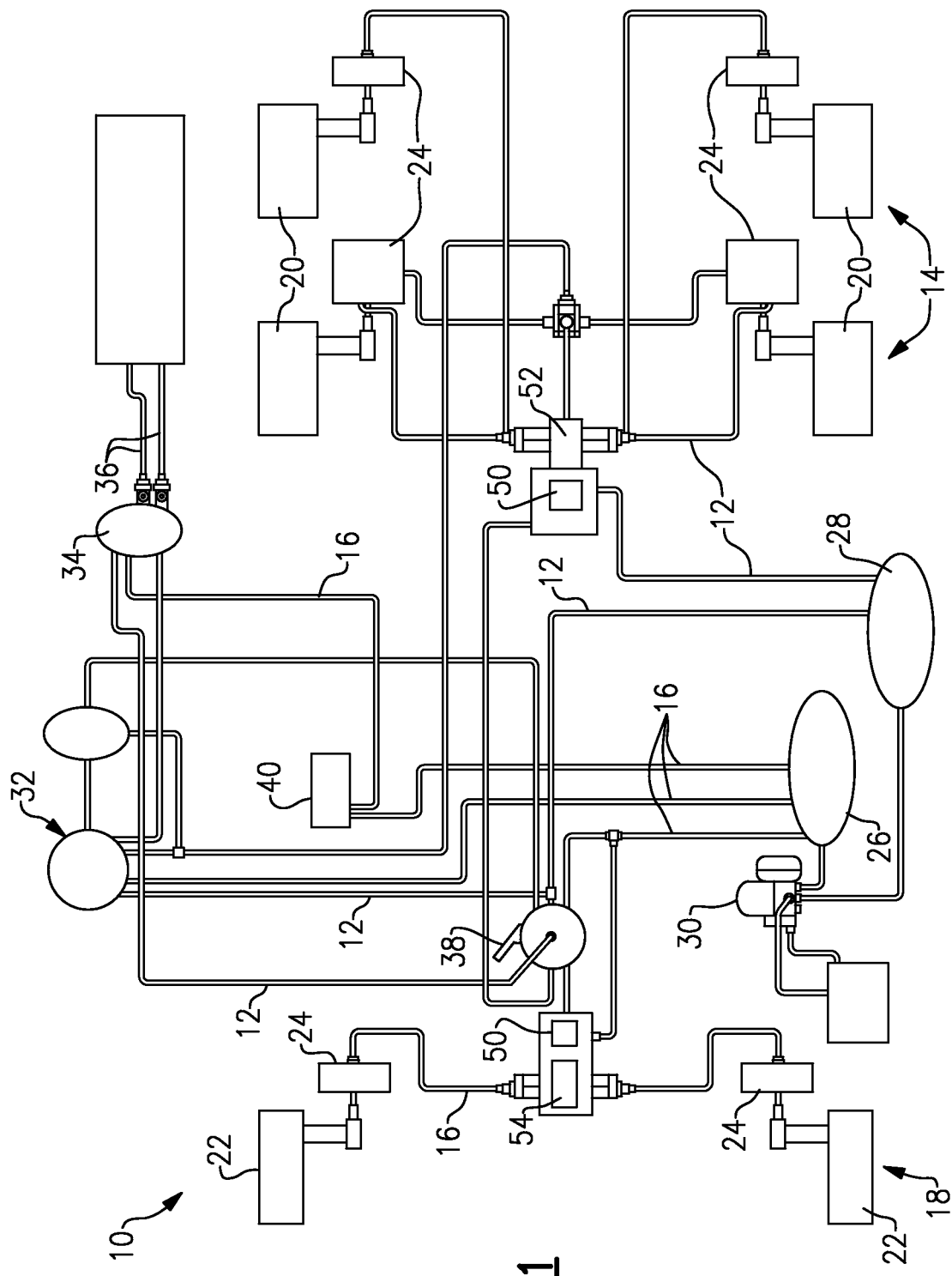
FIG. 1 is a schematic representation of a vehicle brake system with a regenerative brake module.

A braking system 10 for a hybrid vehicle includes a primary brake circuit 12 for a rear axle 14 and a secondary brake circuit 16 for a front axle 18. The exemplary hybrid vehicle includes a drive system with an electric motor and combustion engine that cooperate to propel the vehicle; however, in alternate embodiments other hybrid vehicles (for example, hydraulic hybrids and spinwheel hybrids), and electric vehicle configurations may utilize the brake circuit described herein. The rear axle 14 includes a set of rear wheels 20 and the front axle 18 includes a set of front wheels 22. Each wheel 20, 22 includes a wheel brake with an air chamber 24. A front air supply reservoir 26 is fluidly connected to front air chambers 24 via fluid connections in the secondary brake circuit 16. A rear air supply reservoir 28 is fluidly connected to rear air chambers 24 via fluid connections in the primary brake circuit 12. An air dryer 30 is connected to the front 26 and rear 28 air supply reservoirs to reduce the moisture content of the air being supplied to the reservoirs.

A control valve 32 is fluidly connected to the primary 12 and secondary 16 brake circuits. The control valve 32 can also be optionally fluidly connected to a tractor protection valve 34 and trailer brake system 36. A brake input member, such as a brake treadle 38 for example, is connected to the primary 12 and secondary 16 brake circuits, as well as being connected to the control valve 32. A vehicle operator can press down on the brake treadle 38 to initiate a braking request. The braking system 10 may also include a separately actuated parking brake 40 that can be selectively actuated by the vehicle operator.

The braking system 10 includes a regenerative brake module 50 for each of the front 18 and rear 14 axles. The regenerative brake module 50 for the rear axle 14 is associated with a rear relay valve 52 that is part of a brake relay circuit. The regenerative brake module 50 for the front axle 18 is the same as the module for the rear axle; however, the brake module 50 additionally includes a front relay valve 54 not present in the exemplary secondary brake circuit 16.

Figure 2:
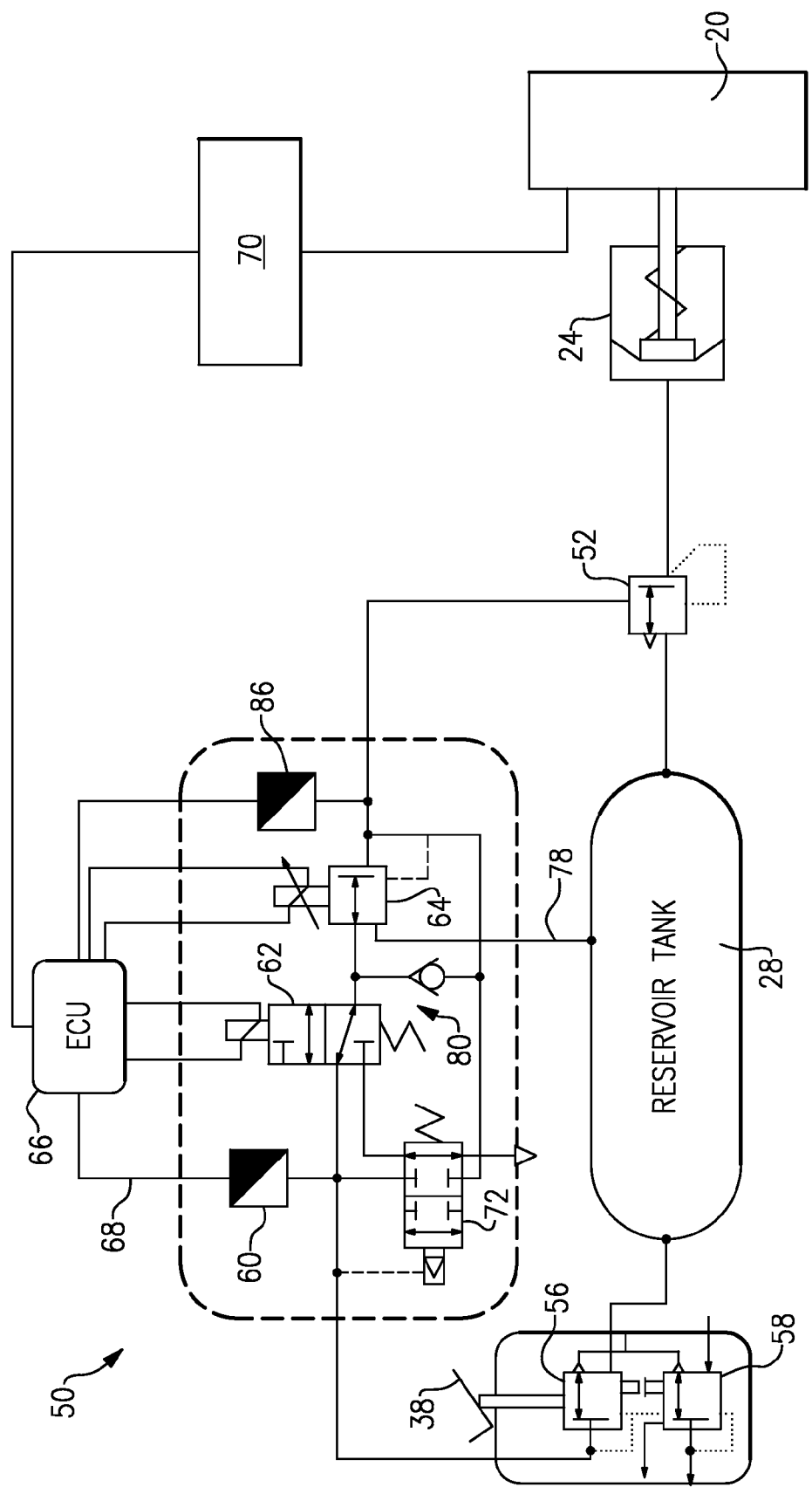
FIG. 2 is a schematic representation of a regenerative brake module as used in the brake system of FIG. 1.

One example of the regenerative brake module 50 is shown in greater detail in FIGS. 2-6. As shown in FIG. 2, the brake treadle 38 forms part of a treadle circuit that includes a first treadle valve 56 for the primary brake circuit 12 and a second treadle valve 58 for the secondary brake circuit 16. In the example shown, a regenerative brake module 50 for the rear axle 14 is shown, with the first treadle valve 56 being fluidly connected to the rear air supply reservoir 28. It should be understood that operation of the regenerative brake module 50 for the front axle 18 would be the same as shown for the rear axle but would be connected through the second treadle valve 58.

A first pressure sensor 60 measures a requested brake pressure generated by the vehicle operator pressing down on the brake treadle 38. A control valve comprising a 3/2 valve 62 for example, is downstream of the first pressure sensor 60. The 3/2 valve 62 is in a normally open position and is operable to move to a closed position to block airflow to vehicle foundation brakes, i.e. to block direct flow to the rear relay valve 52. An electronic pressure regulator valve 64 connects to the 3/2 valve 62 when in the closed position to allow venting. The electronic pressure regulator valve 64 provides a fluid connection between the rear air supply reservoir 28 and the rear relay valve 52 positioned upstream of the rear air chambers 24.

An electronic control unit 66 receives the vehicle operator brake pressure request, i.e. a treadle pressure input signal 68, and compares the requested brake pressure to an available amount of regenerative brake torque that can be provided by an alternative power source 70, such as an electric generator for example. A determination of available regenerative braking can take into account parameters such as vehicle speed, passenger ride preference, the brake request, the regenerative capacity of the vehicle, energy storage state-of-charge or equivalent, and various powertrain and engine characteristics. Although an exemplary embodiment is described in which the electronic control unit 66 determines an 'available regenerative braking' it is to be understood the electronic control unit can determine a target regenerative braking level based on based on vehicle parameters that is less the maximum available regenerative braking level and control the vehicle based on the target regenerative braking level. For example, the target regenerative braking level may be less than the available regenerative braking during transient conditions such as a shift event. The electronic control unit 66 can determine an amount of foundation brake pressure based on the available regenerative braking level, for example to supplement regenerative braking to generate a desired total brake torque. The electronic control unit 66 generates a control signal based on the determined foundation brake level to command the 3/2 valve 62 to the closed position thereby connecting the electronic pressure regulator valve 64 to the reservoir and providing desired foundation brake pressure needed to the rear relay valve 52 of the brake relay circuit.

In one example, a vehicle operator generates a brake request measured by the first pressure sensor at 30 psi. The electronic control unit 66 determines how much total braking torque is being requested by translating the pressure signal to a brake torque output, for example 1000 Nm by modeling or using a lookup table. The control unit 66 determines the available regenerative braking torque and determines a supplemental foundation brake level based on the brake torque output and the available regenerative braking torque. This torque requirement is translated back to a reduced brake application pressure by the electronic control unit 66 and is delivered by the pressure regulator 64 from the reservoir to the wheel brakes via relay valve 52 and the air chambers 24. For example, if the request is 1000 Nm and the available regenerative torque is 200 Nm, then the foundation brakes will supply the remaining 800 Nm. The calculation of total brake torque versus treadle pressure requires a known number of braking units and does not take into account trailer brakes, which comprise a variable braking source. Application of this regenerative brake module 50 to the trailer brake air circuit would also be possible if the number of trailer brakes were determined. Further, this air braking system is also set forth and described in co-pending application Ser. No. 13/160,728, filed on even date herewith and assigned to the same assignee as the present invention, which is directed to a valve as used in the air braking system. The subject matter of Ser. No. 13/160,728 is herein incorporated by reference.

At least one pressure-piloted valve 72 selectively provides fluid communication between the treadle 38 and the relay valve 52 when the requested brake pressure is greater than a predetermined (override) value limit, i.e. a mechanical bypass is provided to quickly and efficiently accommodate aggressive braking requests. In one example, a second pressure sensor 86 is included that measures a delivered brake pressure to the relay valve and communicates the delivered brake pressure to the electronic control unit 66 to provide a closed-loop system.

Thus, the first pressure sensor 60, second pressure sensor 86, the 3/2 valve 62, the pressure-piloted valve 72, the electronic pressure regulator valve 64, and the electronic control unit 66 cooperate to form the regenerative brake module 50. The regenerative brake module 50 is switchable between a system "off" condition and a system "on" condition depending on various factors such as an amount of braking requested, vehicle speed, road conditions, etc.

Figure 3:
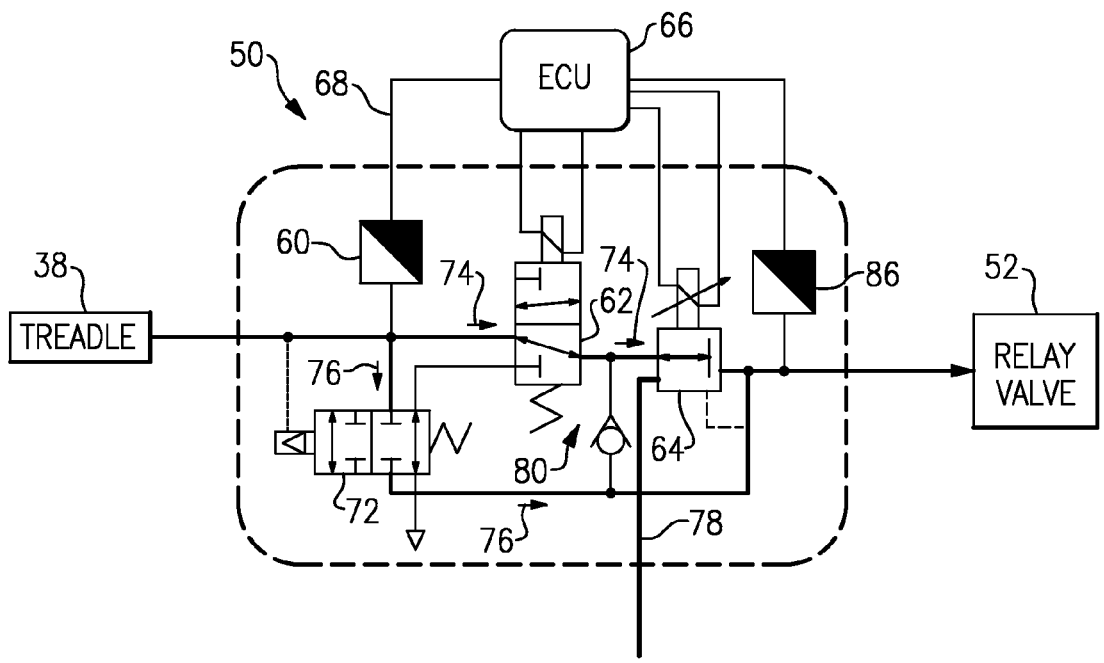
FIG. 3 is the regenerative brake module of FIG. 2 in a system off condition.

FIG. 3 shows an example of the regenerative brake module 50 being in the system off condition For example, the control module can determine and command the system off condition when a stability control event (ABS, traction control, etc.) is detected, at slow speed, when the energy storage devices are at a maximum state of charge, or when a system fault is detected. In the system off condition the 3/2 valve 62 is normally open such that air can flow through the 3/2 valve 62, to the pressure regulator 64, and to the relay valve 52 (as indicated by flowpath 74). At pressures that exceed the predetermined limit, the pressure piloted valve 72 opens a secondary flowpath 76 to fluidly connect the pressure to the relay valve 52. In the off state both flowpaths are available depending on the treadle pressure. The pressure regulator valve 64 is connected to the supply reservoir 28 as indicated at 78. Thus, in this system off condition, there is standard air brake operation with all electronic valves being normally open for control pressure and a mechanical bypass valve being normally closed but which can provide a secondary flow path in response to pressures exceeding a predetermined limit.

Figure 4:
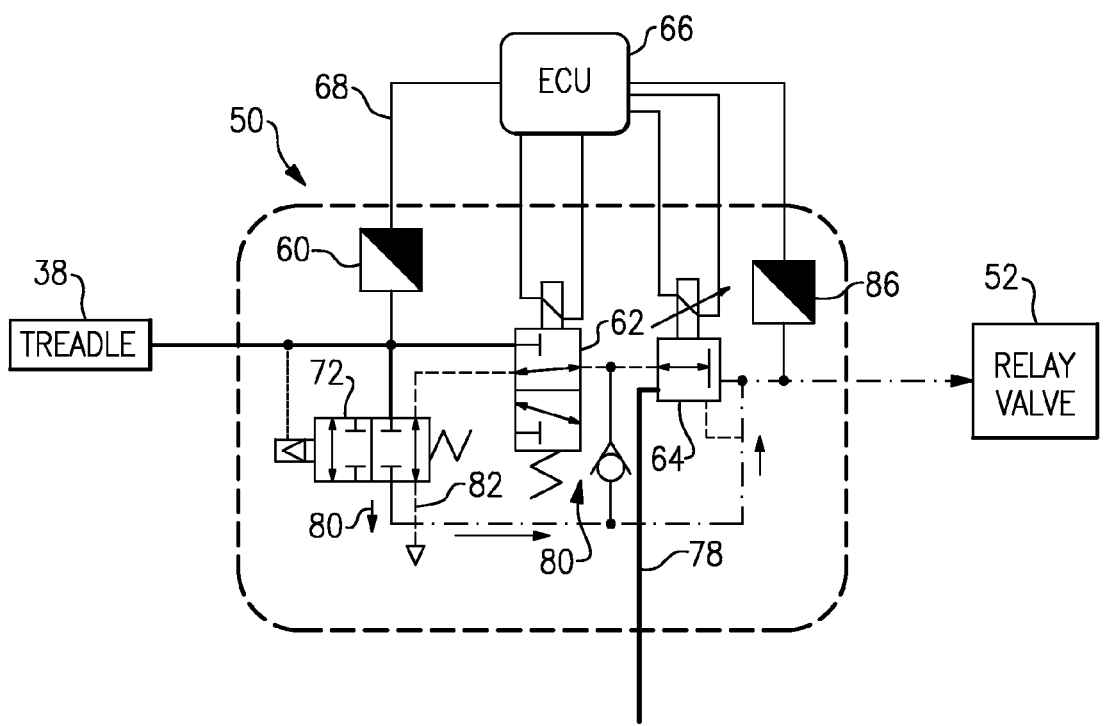
FIG. 4 is the regenerative brake module of FIG. 2 in a system on condition.

FIG. 4 shows the system on condition, which typically corresponds to a situation where low pressure (pressure below the predetermined limit) braking is requested. In the system on condition (regenerative braking active) the treadle pressure is blocked by the 3/2 valve 62 and the electronic control unit 66 reads this treadle pressure as a braking request. The electronic control unit 66 then generates a command signal which is communicated to the pressure regulator 64 to provide an alternate pressure, i.e. the control unit 66 modifies the treadle circuit request.

When this occurs, the 3/2 valve 62 is moved to the closed position, as shown in FIG. 4, to block air flow from the treadle circuit and to open an exhaust path 82 through the pressure-piloted valve 72 for the electronic pressure regulator 64 to utilize during delivery of the pressure required by the electronic control unit 66. The electronic pressure regulator valve 64 delivers pressure from the reservoir connection 78 to the relay valve 52. The pressure-piloted valve 72 remains closed in this condition to isolate the requested treadle pressure from the pressure signal delivered by the electronic pressure regulator 64.

A second pressure sensor 86 is positioned downstream of the pressure regulator valve 64 and upstream of the relay valve 52 to measure the pressure being delivered to the relay valve 52. Thus, in the system on condition a commanded pressure is delivered from the supply reservoir 28 via the electronic pressure regulator 64 to the relay valve 52, a vent path is provided for the pressure regulator valve 64, and the delivered brake pressure is monitored by the second pressure sensor 86 to provide closed loop control. Further, in the event of a full holdoff, the air brakes can be "prepped" at a crack pressure.

Figure 5:
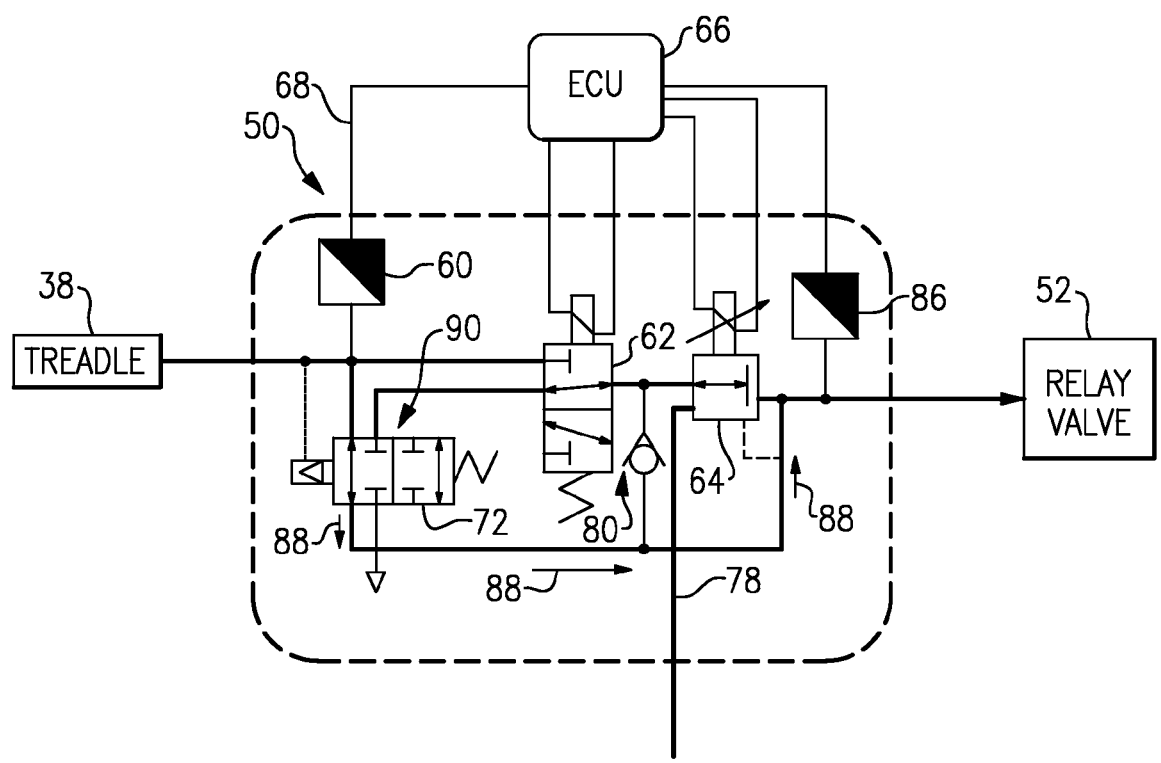
FIG. 5 is the regenerative brake module of FIG. 2 in an aggressive braking condition.

FIG. 5 shows the regenerative brake module 50 in a "push through" braking condition, which would occur during a high pressure (above predetermined pressure limit) braking event, i.e. aggressive or panic stopping. In response to an aggressive braking request, the electronic control unit receives the high pressure signal from the pressure sensor 60 and cancels regenerative braking operation, returning the 3/2 valve to its normally open position, and communicates the treadle pressure through the electronic pressure regulator 64 to the relay valve 52. In addition, the pressure-piloted valve 72 moves to a secondary position where air flow is communicated through the pressure-piloted valve 72 to a location downstream of the electronic pressure regulator valve 64 (as indicated by flowpath 88). Further, air flow venting from the 3/2 valve 62 is blocked by the pressure-piloted valve 72 (as indicated at 90) such that all available pressure generated by the treadle is communicated directly to the relay valve 52. The redundant operation of blocking the exhaust port serves to alleviate any inadvertent venting of the treadle pressure if the system could not react fast enough during a panic stop or failed to cancel the regenerative braking mode for some reason.

Thus, if the system is in the "on" condition and a vehicle operator initiates a panic stop, the treadle pressure overpowers the pressure-piloted valve 72 and the pressure-piloted valve 72 blocks the vent option of the pressure regulator valve 64. In other words, in this situation the treadle pressure signal overrides electronic control and the treadle pressure is sent directly to the relay valve 52. As discussed above, the second pressure sensor 86 measures the delivered brake pressure supplied to the relay valve 52 and communicates the delivered brake pressure to the electronic control unit 66 to provide a closed-loop system. If the first pressure sensor 60 or the second pressure sensor 86 reads a pressure in excess of the predetermined limit, i.e. the pressure limit of the pressure-piloted valve 72, when the pressure-piloted valve 72 is moved to the bypass position, the pressure sensor 86 communicates the pressure data to the electronic control unit 66 to cancel the control (system on) mode and revert to a system off condition.

The regenerative brake module 50 also incorporates a fault sensing condition. During normal operation, when the system is in the off condition, the first 60 and second 86 pressure sensors read the same pressure. If the sensors read different pressures, this can be used to detect possible valve failures. If one of the sensors fails, for example if the treadle pressure sensor (first pressure sensor 60) fails, the second pressure sensor 86 would still be capable of reading the requested pressure. Any difference between a failed delivery sensor and the pressure regulator valve 64 (associated with the second pressure sensor 86) can be used in a perturbation test to determine a cause of the failure. As such, a double component failure is required to lose each brake circuit operation.

Figure 6:
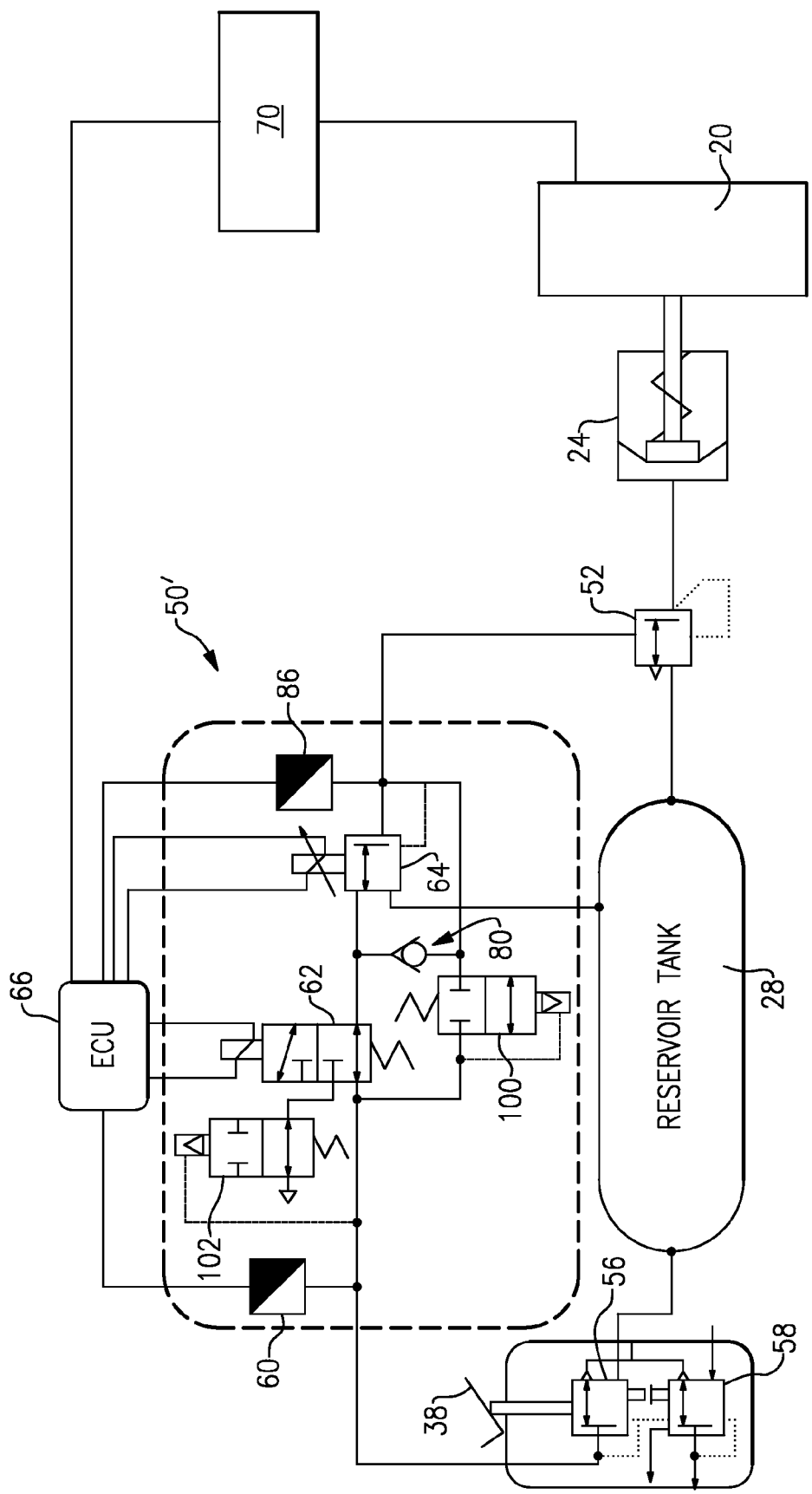
FIG. 6 is another example of a regenerative brake module that can be used in the brake system of FIG. 1.

FIG. 6 shows another example of a regenerative brake module 50'. This configuration is similar to that of FIGS. 2-5; however, the pressure-piloted valve 72 is separated into two pressure control valves. A first pressure piloted valve 100 is operable to bypass the 3/2 valve 62 when pressure exceeds a first predetermined limit, which would occurring during an event as described above with regard to FIG. 4 or 5. A second pressure-piloted valve 102 is operable to block pressure from exhausting from the 3/2 valve 62 when pressure exceeds a second predetermined limit, which would occur during an aggressive braking request as described above with regard to FIG. 5. The first and second predetermined limits are set to a common pressure which would be within the range of 20-50 psi, for example.

In an optional embodiment, the brake module 50 can include an additional check valve, schematically indicated at 80. This valve 80 would be operational only during a failure mode as described below. In the system "on" condition, if the pressure regulator 64 fails to switch off when treadle pressure exceeds the override limit, i.e. when the bypass valve is tripped, then there is a condition where two pressure regulators would be fighting for control. For this reason, the valve 72 is configured to block the exhaust path such that the valve does not allow the pressure regulator 64 to vent treadle pressure back to the control unit's commanded value, i.e. a lower pressure.

However, the valve may still attempt to ventilate. In a situation where treadle pressure exceeds the override limit and continues to increase, the pressure regulator 64 may try to vent what is considered to be excessive downstream pressure, which fills the blocked vent air passage with high pressure air. As treadle pressure begins to decrease, but is still higher than the override limit, the high pressure air is still trapped behind the pressure regulator 64. This results in application of an unbalance load on the pressure regulator valve 64 and serves as a mechanical mechanism to request more pressure from the regulator. The result is that the regulator will start to deliver pressurized air from the reservoir as pressure from the treadle is decreasing, causing a backflow through the treadle. Adding the check valve 80 allows this pressure to escape in this failure state and prevents backflow. If the check valve 80 is not included, the system may have a lag in brake release timing if the control unit 66 does not properly cancel out of the regenerative braking mode in this particular failure mode.

Another example of a regenerative brake module 200 is shown in FIGS. 7-10. This configuration is similar to that of FIGS. 2-5; however, the mechanical bypass, i.e. the pressure-piloted valve 72 comprises a valve 202 that includes a stage one valve 204 and a stage two valve 206.

Figure 7:
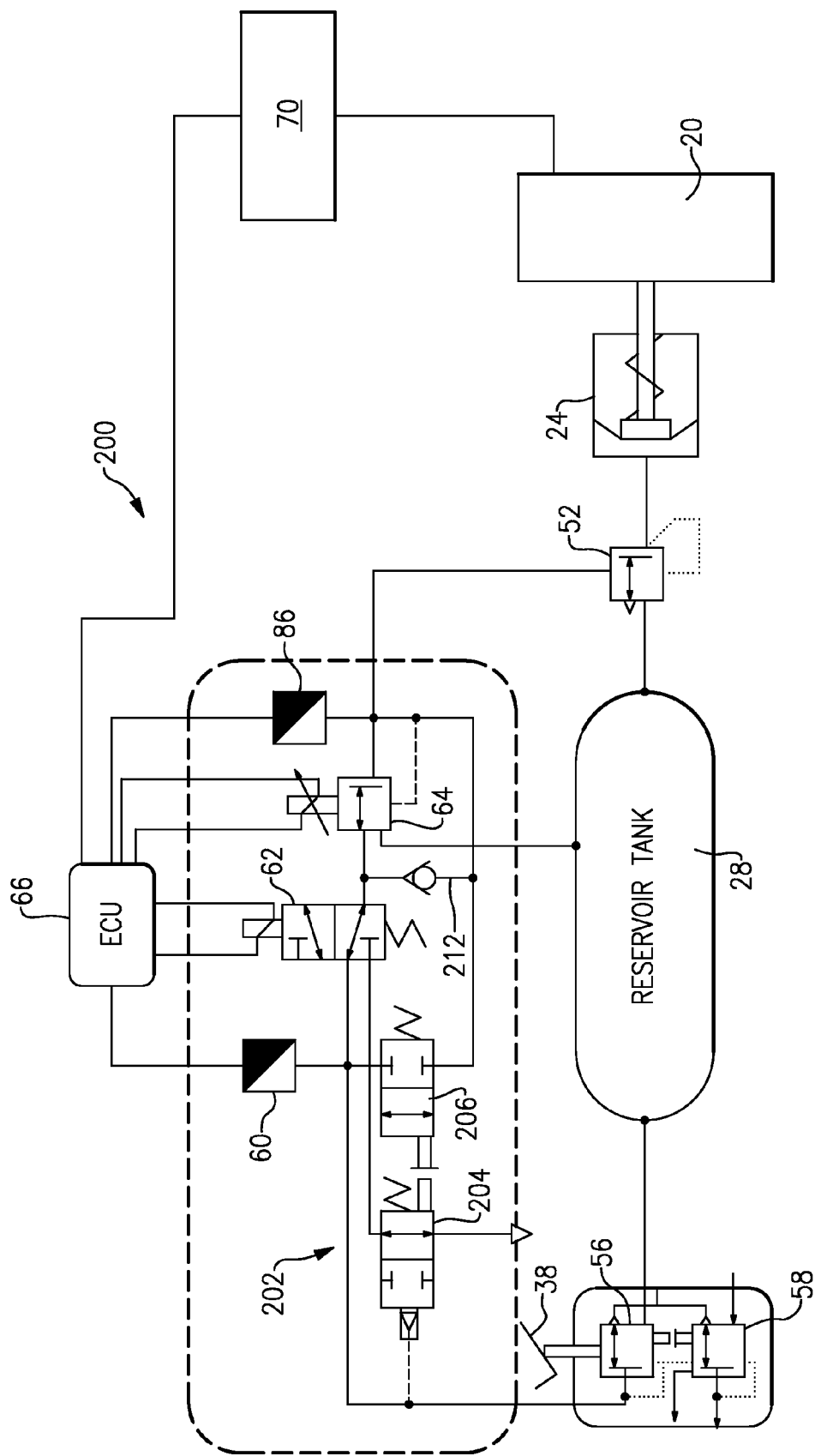
FIG. 7 is another example of a regenerative brake module shown in a standard brake operation mode.

FIG. 7 shows a configuration that corresponds to a system "off" mode which occurs during standard braking operations. In this mode, the 3/2 valve 62 is in a normally open position and fluidly connected to the relay valve 52 through the pressure regulator valve 64, which is also in a normally open position. As such, treadle pressure from a treadle circuit is communicated directly to the relay valve 52 in a relay circuit of the brake system to allow standard braking to occur in response to braking requests input to the treadle 38.

Figure 8:
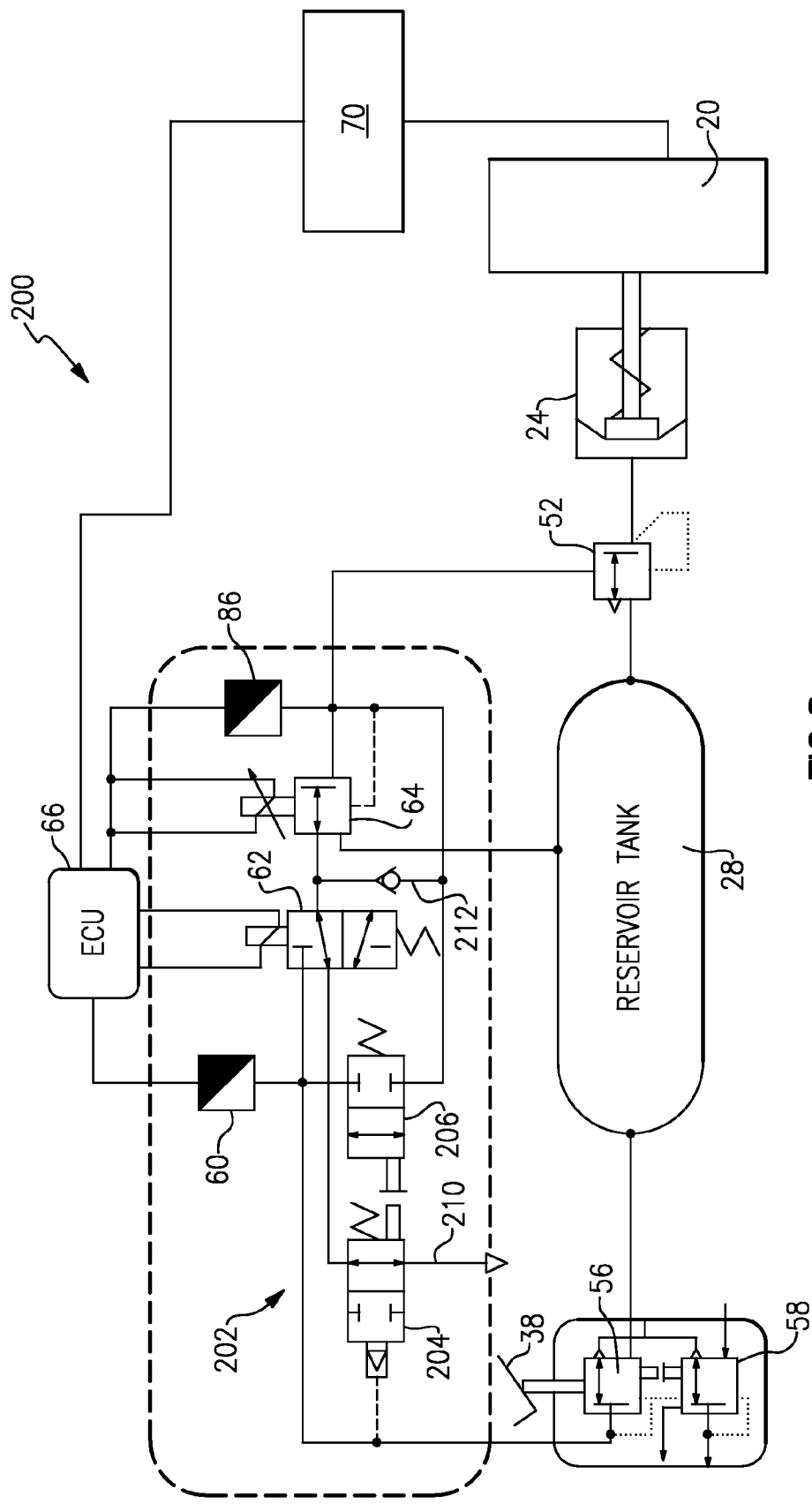
FIG. 8 is the regenerative brake module of FIG. 7 in a lower pressure, regenerative brake operation condition.

FIG. 8 shows a configuration for a system "on" condition that comprises a first mode of operation. This first mode of operation is for braking requests that comprise a low pressure condition, i.e. requested pressures are below a predetermined limit such as 20-50 psi for example. In this mode of operation, the 3/2 valve 62 is moved to a position that blocks treadle pressure and opens an exhaust path 210 for the 3/2 command valve to the stage one valve 204. As such, air can be exhausted through the regulator valve 64, through the 3/2 valve 62 and out through the stage one valve 204. The stage two valve 206 continues to block access to the treadle circuit.

The first pressure sensor 60 reads the command pressure, i.e. the pressure requested as a result of an input to the treadle 38, and communicates this pressure to the electronic control unit 66. The control unit 66 determines how much regenerative braking can be supplied and then determines how much air pressure to deliver from the reservoir 28 to supply any remaining pressure needed. As such, the requested pressure, instead of being wholly supplied via the reservoir as occurs in standard operation, is supplied as a combination of regenerative braking and a reduced amount of reservoir air pressure. Thus, the air pressure delivered to the relay valve 52 is less than the command pressure. The second pressure sensor 86 measures the pressure supplied to the relay valve 52 and communicates this measured pressure back to the control unit 66 to establish a closed loop control of delivery pressure.

Figure 9:
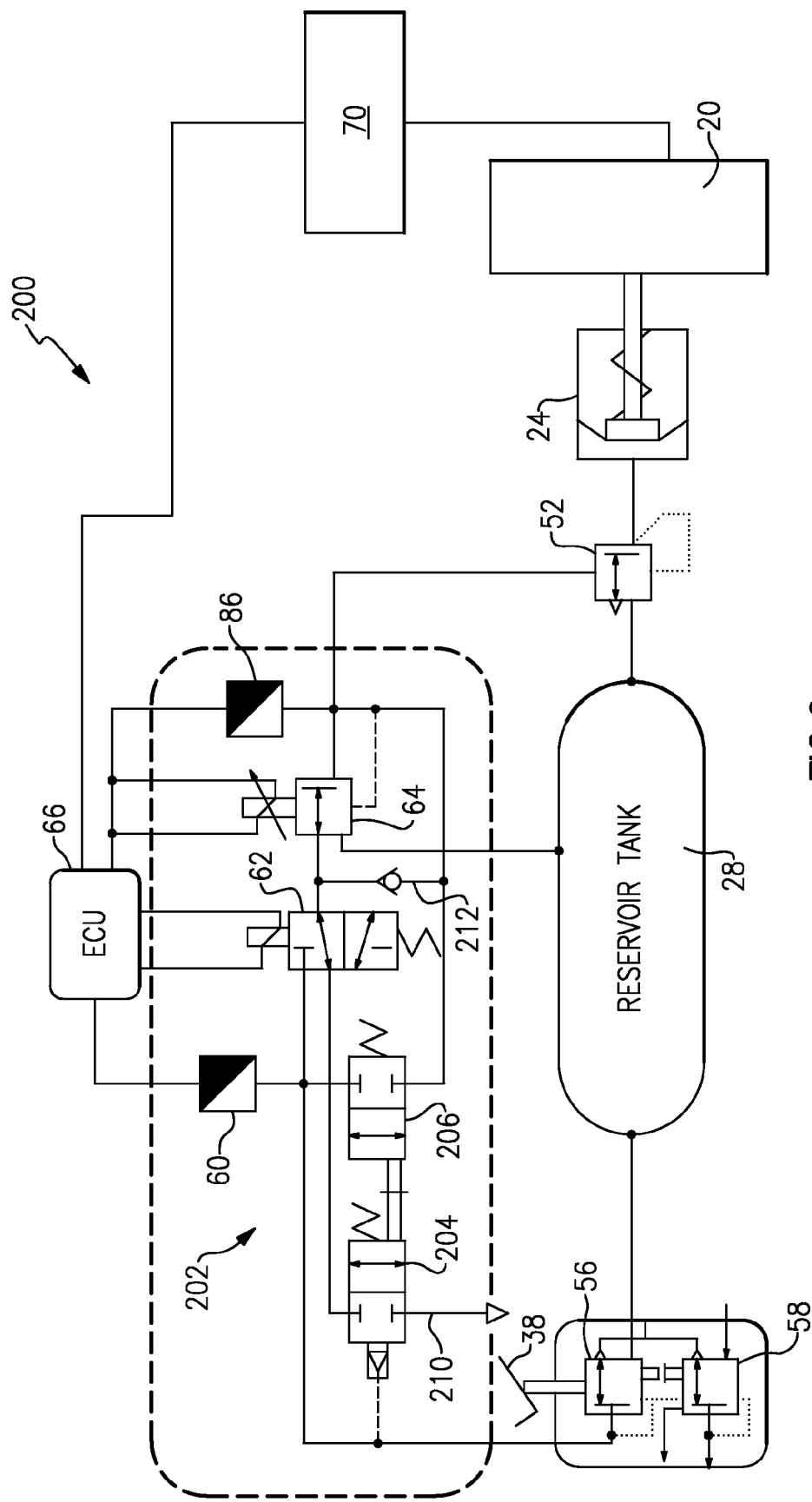
FIG. 9 is the regenerative brake module of FIG. 7 in a mid-pressure, regenerative brake shutdown sequence.

FIG. 9 shows another mode of operation that corresponds to a mid-pressure, regenerative brake shutdown sequence. This occurs at pressures that exceed the predetermined pressure limit set for the FIG. 8 configuration, but which are less than an override limit that would be set for a panic or aggressive brake request such as that which will be discussed with regard to FIG. 10.

In the mid-pressure mode of operation, initially the 3/2 valve 62 blocks the treadle pressure and the stage two valve 206 is also in a blocking position. The stage one valve 204 also moves to a blocking position to block the exhaust path 210 from the regulator valve 64 and 3/2 valve 62. Initially, the braking supplied to the wheel 20 is a blend of regenerative braking and a reduced air pressure, i.e. reduced compared to the command request, from the reservoir. However, in this mode, the control unit 66 blends out the regenerative braking such that the system will revert to the "off" mode as shown in FIG. 7 for standard brake operation. Thus, the 3/2 valve 62 will move from the blocking position shown in FIG. 9 back to a normally open position.

Figure 10:
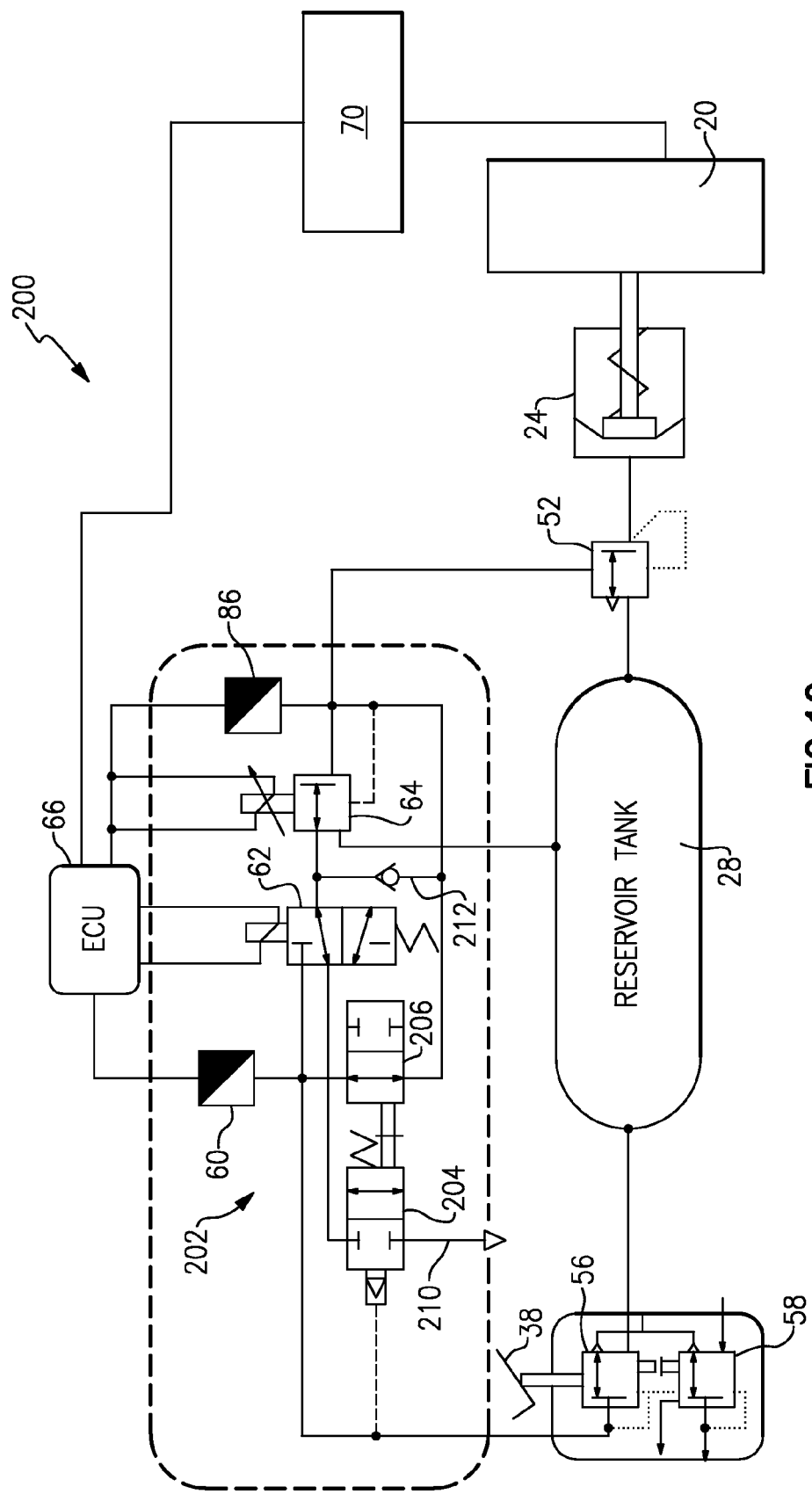
FIG. 10 is the regenerative brake module of FIG. 7 in high pressure, regenerative brake override condition.

FIG. 10 shows a second mode of operation that corresponds to a high pressure, regenerative brake override condition. This would occur for a panic braking or aggressive braking request. In this configuration the stage one valve 204 blocks the exhaust path 210 and the stage two valve 206 moves to an open position, i.e. a bypass position, to directly connect the treadle circuit to the relay circuit, i.e. treadle pressure is directly supplied to the relay valve 52. The control unit 66 has no capability to override the treadle pressure and the system returns to the "off" mode as shown in FIG. 7.

In an optional embodiment, the brake module 200 can include an additional check valve, schematically indicated at 212. This valve 212 would be operational only during a failure mode as described below. In the system "on" condition, if the pressure regulator 64 fails to switch off when treadle pressure exceeds the override limit, i.e. when the bypass valve 202 is tripped, then there is a condition where two pressure regulators would be fighting for control. For this reason, the stage one valve 204 is configured to block the exhaust path 210 such that the valve does not allow the pressure regulator 64 to vent treadle pressure back to the control unit's commanded value, i.e. a lower pressure.

However, the valve may still attempt to ventilate. In a situation where treadle pressure exceeds the override limit and continues to increase, the pressure regulator 64 may try to vent what is considered to be excessive downstream pressure, which fills the blocked vent air passage with high pressure air. As treadle pressure begins to decrease, but is still higher than the override limit, the high pressure air is still trapped behind the pressure regulator 64. This results in application of an unbalance load on the pressure regulator valve 64 and serves as a mechanical mechanism to request more pressure from the regulator. The result is that the regulator will start to deliver pressurized air from the reservoir as pressure from the treadle is decreasing, causing a backflow through the treadle. Adding the check valve 212 allows this pressure to escape in this failure state and prevents backflow. If the check valve 212 is not included, the system may have a lag in brake release timing if the control unit 66 does not properly cancel out of the regenerative braking mode.

Figure 11:
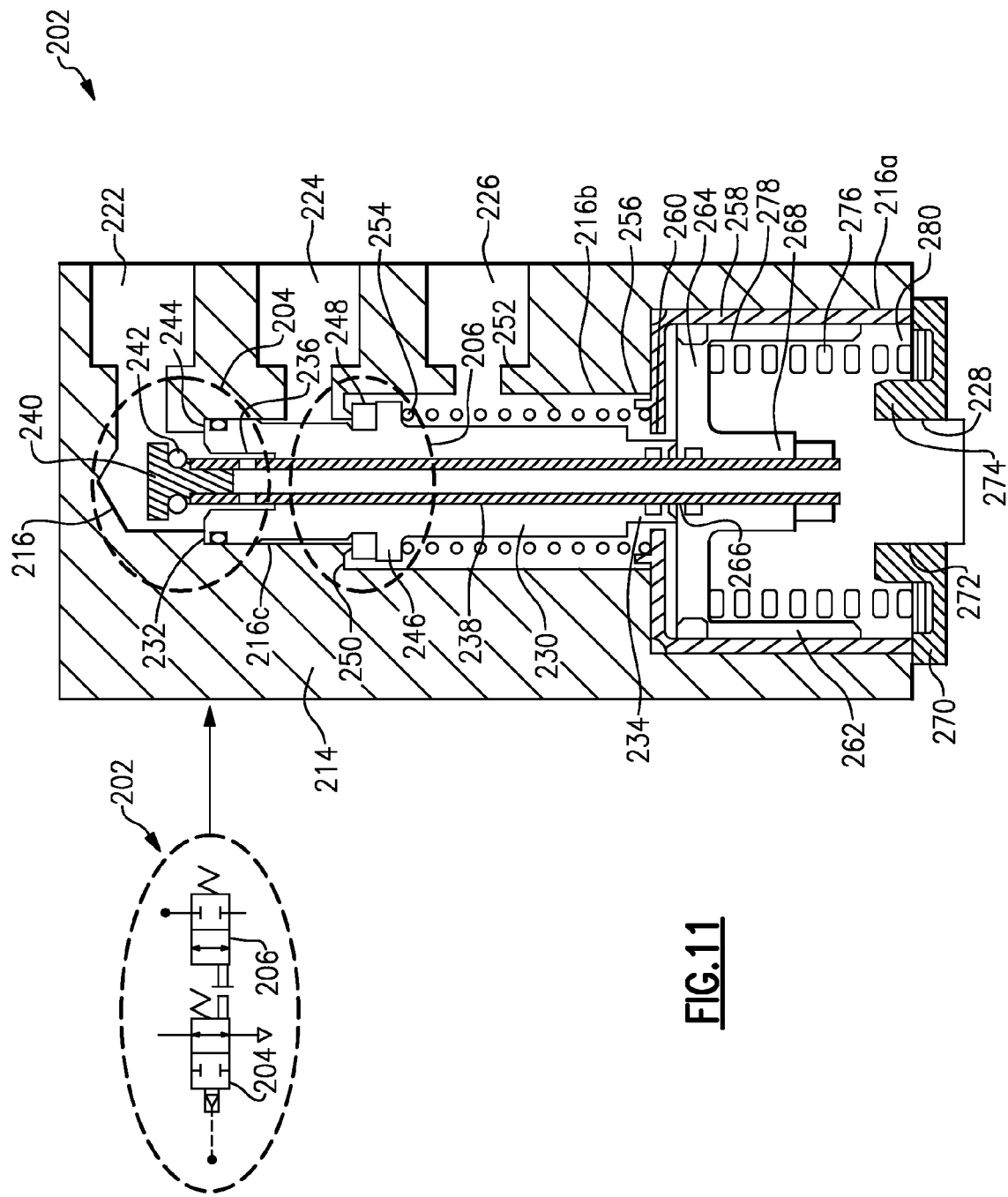
FIG. 11 is a schematic representation of a bypass valve combining stage one and stage two valves that can be used in a regenerative brake module as shown in FIGS. 7-10.
Figure 12:
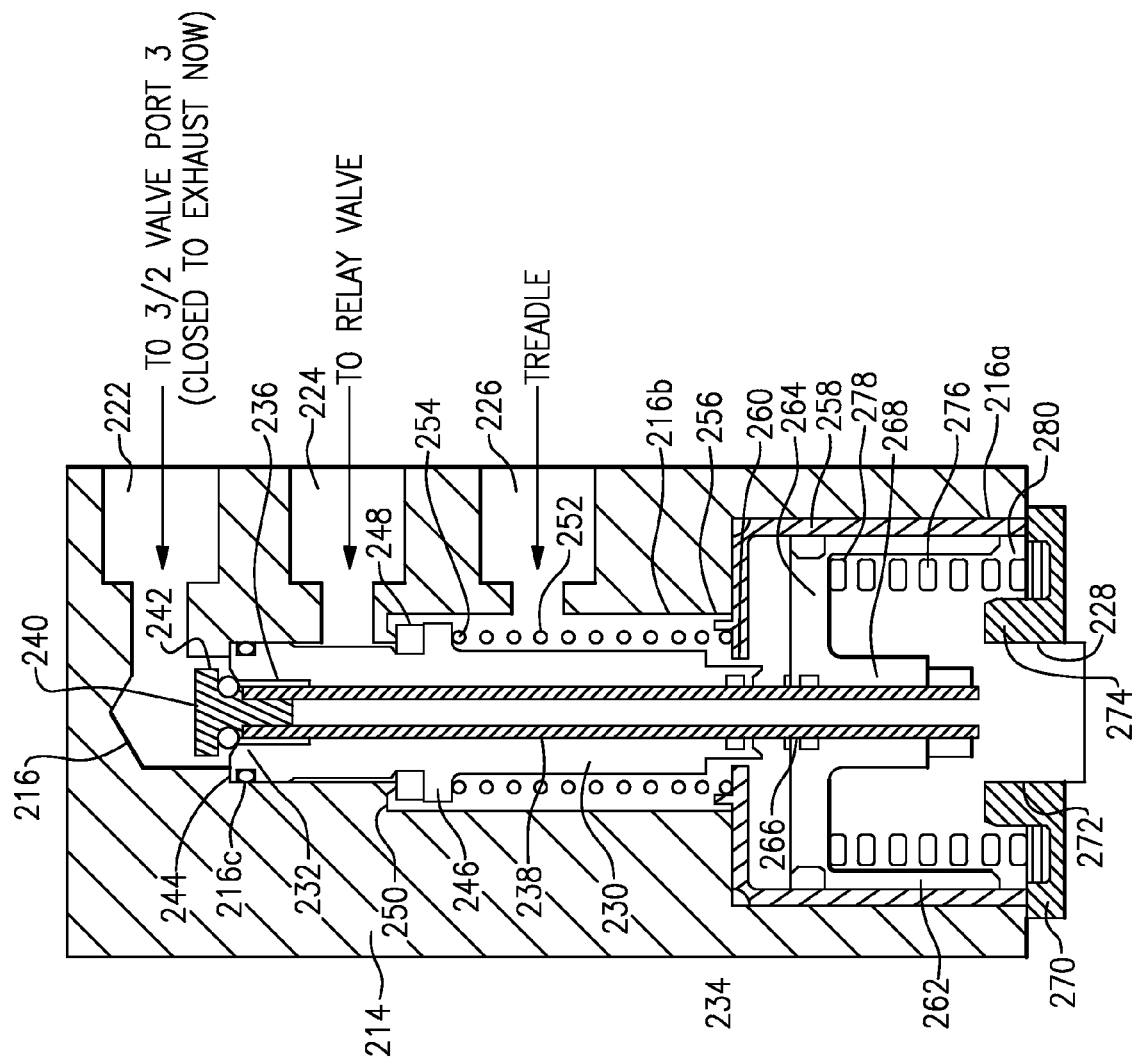
FIG. 12 is the bypass valve of FIG. 11 with a pressure regulator blocked condition and with stage one closed, which corresponds to FIG. 9.
Figure 12:
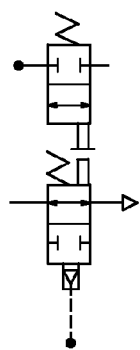
Figure 13:
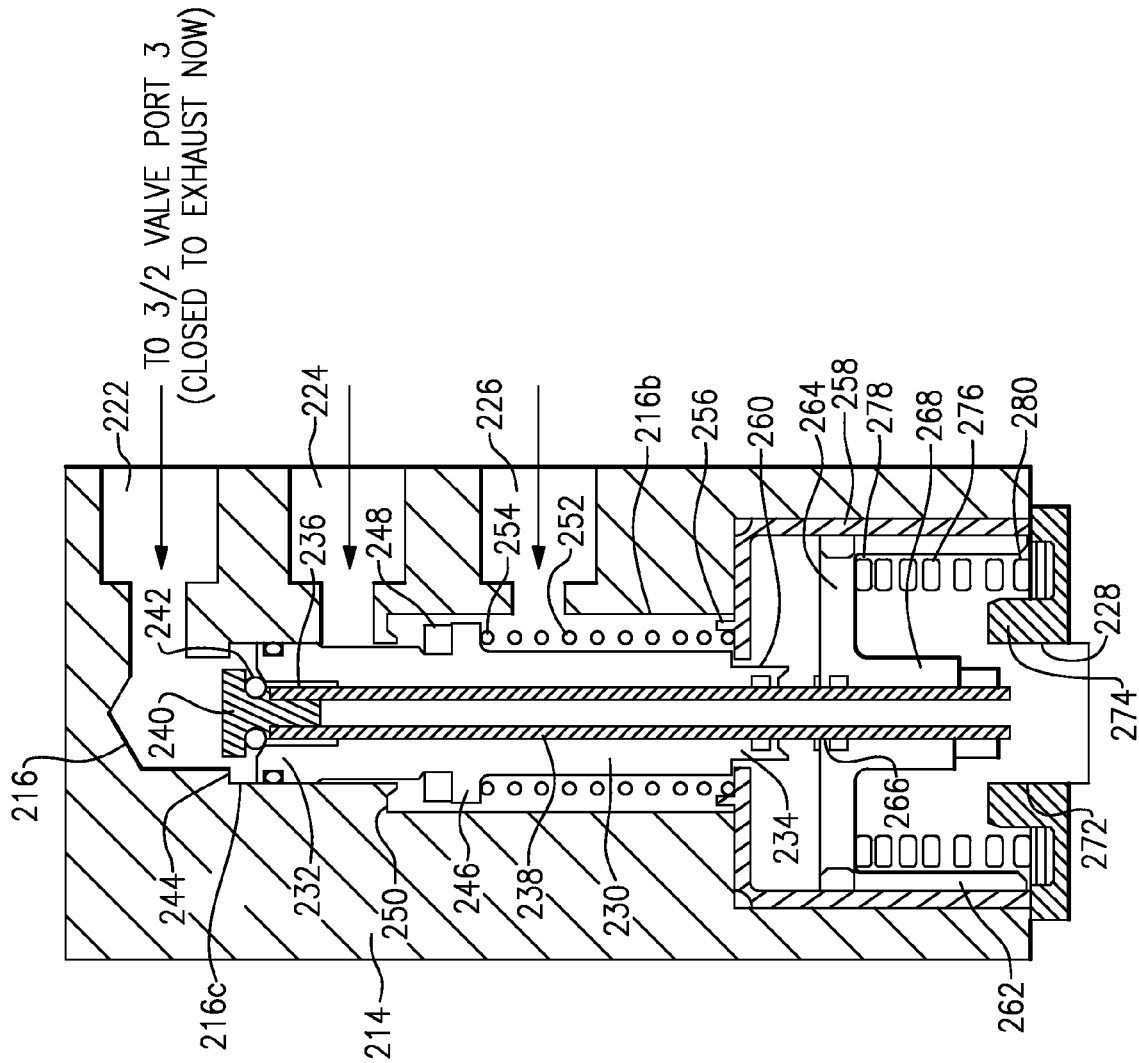
FIG. 13 is the bypass valve of FIG. 11 with a pressure regulator blocked condition and with the stage two valve open to provide a bypass flowpath as shown in FIG. 10.
Figure 13:
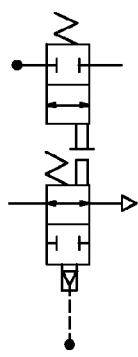

FIGS. 11-13 show the bypass valve 202 as used in the configuration shown in FIGS. 7-10. The bypass valve 202 incorporates the stage one 204 and stage two 206 valves as discussed above.

The bypass valve 202 has a valve body 214 that includes a bore 216 that receives the stage one 204 and stage two 206 valves. The bore 216 has an enlarged bore portion 216a of a maximum bore diameter at one valve end. A first reduced bore portion 216b extends from the enlarged bore portion 216a to a second reduced bore portion 216c. The stage one valve 204 is normally open and the stage two valve 206 is normally closed. The valve body 214 includes a 3/2 valve port 222, a relay valve port 224, a treadle port 226, and an exhaust port 228 that exhaust out of the enlarged bore portion 216a.

A shaft 230 is fit within the valve body 214 in a sliding relationship and extends between a first shaft end 232 and a second shaft end 234. A bore 236 is formed within the shaft 230 and extends from the first shaft end 232 to the second shaft end 234. Fit within the bore 236 is a tube 238 that receives a plunger 240 at the first shaft end 232. The plunger 240 has a stem or shaft portion that is slidingly received within the tube 238 and an enlarged head portion that extends out of the tube 238. A seal 242 is received around the shaft portion and abuts against an underside of the enlarged head portion.

In the configuration shown in FIG. 11, the system is in a low pressure mode such as that described above with regard to FIG. 8. The first shaft end 232 is seated against a first valve seat 244 formed at one end of the second reduced bore portion 216c and the plunger 240 is positioned such that the seal 242 is moved out of engagement with the shaft 230 to allow the pressure regulator 64 to connect to the exhaust path 210 via port 222.

The shaft 230 also includes an enlarged flange portion 246 that supports a sealing member 248 for engagement with a second seal seat 250 formed at the transition between the first reduced bore portion 216b and the second reduced bore portion 216c. A resilient member 252 has one end 254 supported on a side of the flange portion 246 that is opposite of the sealing member 248 and an opposite end 256 that is seated against an insert member 258 that is fit within the enlarged bore portion 216a. The insert member 258 comprises a cup-shaped member having a base portion with an opening 260 through which the second shaft end 234 extends. A surface of the base portion surrounding the opening 260 provides a seat of the end 256 of the resilient member 252.

Received within the insert member 258 is a piston 262 that also comprises a cup-shaped member. A piston head portion 264 of the piston 262 faces the base portion of the insert member 258 and includes an opening 266 to receive the tube 238. A stem 268 surrounds the opening 266 and extends outwardly from the piston head portion 264 in a direction away from the base portion of the insert member 258. The tube 238 extends through the stem 268.

An end cap 270 is fit against the valve body 214 at an open end of the enlarged bore portion 216a. The end cap 270 includes an opening 272 for the exhaust path 210. Surrounding the opening 272 is a lip 274 that extends inwardly toward the piston 262. A resilient member 276 is seated within the piston 262. One end 278 of the resilient member 276 is seated against the piston head portion 264 and an opposite end 280 of the resilient member 276 is seated against end cap 270 to surround the lip 274.

As discussed above, FIG. 11 discloses a low pressure mode for the brake system. The 3/2 valve port 222 is open such that the pressure regulator 64 is free to use the exhaust path through the tube 238 and out the exhaust port 228. As shown, the plunger 240 is moved out of engagement with the shaft 230 to open the exhaust path and the relay valve port 224 is blocked. The treadle port 226 that is connectable to the treadle circuit is inactive at low braking pressures. As such, the valve design provides a balanced configuration where performance is independent of the downstream relay valve pressure.

In FIG. 12, the valve 202 is in a position that corresponds to the mode set forth in FIG. 9. The plunger 240 is sealingly seated within the tube 238 and shaft 230 such that the pressure regulator 64 is blocked at the 3/2 valve port 222 from allowing exhaust flow out of port 228. As such, the pressure regulator 64 is blocked from lowering the brake pressure and the control unit 66 is configured to blend out of the regenerative braking to return to standard brake operation. As shown, the stage one valve 204 has closed and the piston 262 has moved away from the insert 258. This mode would occur at pressures that exceed a predetermined limit that would be within the range of 20-50 psi, for example.

In FIG. 13, the valve 202 is in a position that corresponds to the mode set forth in FIG. 10. The exhaust path is blocked via the plunger 240 at the 3/2 valve port 222. The piston 262 has moved further away from the insert 258, and the flange portion is unseated from the second valve seat 250. This connects the treadle circuit directly to the relay circuit for an aggressive braking condition via the relay valve port 224 and the treadle port 226. The electronic valves are therefore immediately bypassed and the control unit 66 cannot override the bypass valve 202 in this condition.

As shown and discussed, the various movements of the valve components occur in stages. The second stage 206 is normally closed, but as treadle pressure increases the valve is configured initially move the piston 262 away from the shaft end 234 to first blend out regenerative braking at mid-pressure ranges. As treadle pressure increases for an aggressive braking request, the shaft 230 is free to move the flange portion 246 away from the second valve seat 250 due to the compressed movement of the piston 262. This directly connects the relay and treadle circuits.

The subject braking system 10 operates to provide computer controlled brake blending while maintaining appropriate mechanical safety features. As discussed above, brake treadle pressure is read by a pressure sensor and when the system is in the on condition, the pneumatic signal generated by the vehicle operator is blocked by the 3/2 valve, which is normally open. This valve simultaneously opens an exhaust/vent port for the proportional regulator valve that sends an alternative pressure command to the brake system. The regulator valve taps directly into the supply reservoir and delivers the alternate pressure signal from this supply. The second pressure signal reads the output pressure signal and closes the control loop on the delivery brake pressure. An alternative mechanical bypass exists that opens a self-piloted valve at a predetermined pressure to mechanically limit the regenerative braking zone to a lower range of the brake application range. This keeps regenerative operation in a low-g arrangement and voids vehicle dynamic influences.

In one example, two regenerative brake modules are used on each circuit in the vehicle. The redundancy of the two modules allows cross checking of the input pressure sensor. Examining both pressure sensors in each circuit can determine if there is a valve failure in-between, and a perturbation of the valve setting can examine the delivery sensor function. This module can also provide ATC operation in place of an ATC valve.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve assembly for an air braking system for a vehicle comprising:
    a valve body having a first port adapted for connection to a control valve and pressure regulator; a second port adapted for connection to a brake relay circuit, a third port adapted for connection to a treadle circuit, and an exhaust port;
    a stage one valve positioned within the valve body and biased to a normally open position;
    a stage two valve positioned within the valve body and biased to a normally closed position; and
    wherein in response to treadle pressure that exceeds an override limit, the stage one valve moves to a closed position to block air from being exhausted by the control valve and pressure regulator out of the exhaust port, and the stage two valve directly connects the treadle circuit to the brake relay circuit to deliver treadle circuit air pressure to a vehicle brake.

2. The valve assembly according to claim 1 wherein, in response to a treadle pressure that is less than a predetermined limit, the stage one valve is configured to fluidly connect the first port to the exhaust port and the stage two valve is configured to block treadle pressure from being delivered to the brake relay circuit.

3. The valve assembly according to claim 2 wherein the predetermined limit is less than the override limit.

4. The valve assembly according to claim 2 wherein the first port is directly connected to the control valve which is fluidly connected to the pressure regulator such that pressurized air can be exhausted by the pressure regulator via the control valve and out the exhaust port when the stage one valve is open.

5. The valve assembly according to claim 4 wherein, when treadle pressure is less than the predetermined limit, the relay circuit supplies pressurized air at a pressure level that is less than the treadle pressure generated by a braking request.

6. The valve assembly according to claim 4 wherein the stage one valve is configured to move to the closed position and the stage two valve is configured to remain in the closed position in response to a treadle pressure that is greater than the predetermined limit and less than the override limit.

7. A valve for an air braking system for a vehicle comprising:
    a valve body having an internal bore with a first port adapted for connection to a control valve and pressure regulator, a second port adapted for connection to a brake relay circuit, a third port adapted for connection to a treadle circuit, and an exhaust port;
    a shaft received within the internal bore, the shaft including a central bore that receives a plunger at a first shaft end, the plunger and shaft cooperating to provide a stage one valve that is biased to a normally open position, and wherein the shaft includes an enlarged flange portion that cooperates with a valve seat formed within the valve body to provide a stage two valve that is biased to a normally closed position; and wherein in response to treadle pressure that exceeds an override limit, the stage one valve is configured to move to a closed position to block air from being exhausted by the control valve and pressure regulator out of the exhaust port, and the stage two valve is configured to directly connect the treadle circuit to the brake relay circuit to deliver treadle circuit air pressure to a vehicle brake.

8. The valve according to claim 7 including a tube positioned within the central bore of the shaft, and wherein the plunger comprises an enlarged head with a step portion that is insertable within the tube, and wherein the head portion is moved into sealing engagement with the first shaft end to block air from being exhausted by the control valve and pressure regulator through the tube and out of the exhaust port when treadle pressure exceeds a predetermined limit.

9. The valve according to claim 8 wherein the predetermined limit is less than the override limit.

10. The valve according to claim 9 including an insert member received within the internal bore near the exhaust port, the insert member receiving a piston and a first resilient member, and wherein the insert member includes an opening through which a second end of the shaft extends to abut against the piston when the stage one valve is in the normally open position and the stage two valve is in the normally closed position.

11. The valve according to claim 10 including an end cap fixed to the valve body at the exhaust port, the end cap providing a first seat for a first end of the first resilient member and with the second end of the first resilient member being seated against the piston.

12. The valve according to claim 11 including a second resilient member having a first end seated against the enlarged flange member of the shaft and a second end seated against the insert member.

13. The valve according to claim 12 wherein in response to a treadle pressure that is less than the predetermined limit the plunger moves out of sealing engagement with the shaft to fluidly connect the first port to the exhaust port, and wherein the enlarged flange portion remains seated against the valve seat to block treadle pressure from being delivered to the brake relay circuit.

14. The valve according to claim 13 wherein the plunger moves to the closed position to block the first port from exhausting out of the exhaust port and the enlarged flange portion is configured to remain seated against the valve seat in response to a treadle pressure that is greater than the predetermined limit and less than the override limit.

15. A method of mechanically bypassing an electronically controlled valve assembly for an air braking system for a hybrid vehicle comprising the steps of:
(a) connecting a first port of a valve body to a control valve and pressure regulator, connecting a second port of the valve body to a brake relay circuit, and connecting a third port of the valve body to a treadle circuit;
(b) providing the valve body with an exhaust port;
(c) biasing a stage one valve within the valve body to a normally open position;
(d) biasing a stage two valve within the valve body to a normally closed position; and
(e) in response to treadle pressure that exceeds an override limit, moving the stage one valve to a closed position to block air from being exhausted by the control valve and pressure regulator out of the exhaust port, and moving the stage two valve to directly connect the treadle circuit to the brake relay circuit to deliver treadle circuit air pressure to a vehicle brake.

16. The method according to claim 15 wherein in response to a treadle pressure than is less than a predetermined limit, and wherein the predetermined limit is less than the override limit, the method includes the steps of: moving the stage one valve to fluidly connect the first port to the exhaust port, and configuring the stage two valve to block treadle pressure from being delivered to the brake relay circuit.

17. The method according to claim 16 including directly connecting the first port to the control valve which is fluidly connected to the pressure regulator, and exhausting pressurized air from the pressure regulator through the control valve and out the exhaust port when the stage one valve is open.

* * * * *